March 23, 1965     T. W. STONE     3,175,109
COOLING SYSTEMS
Filed June 6, 1961

*INVENTOR.*
THOMAS W. STONE
BY
*Bayard R. Michael*
ATTORNEY

United States Patent Office 3,175,109
Patented Mar. 23, 1965

3,175,109
COOLING SYSTEMS
Thomas W. Stone, Owosso, Mich., assignor to Controls Company of America, Schiller Park, Ill., a corporation of Delaware
Filed June 6, 1961, Ser. No. 115,180
3 Claims. (Cl. 310—59)

This invention relates to automatic office equipment, and particularly, to the drive mechanism for such equipment.

Office equipment such as tape recorders, dictating machines and the like utilize electric motors for their primary source of power. These motors must be cool running because this type of equipment is adversely affected by heat. Efforts to reduce the cost of such equipment by using low cost motors have not been successful since such motors give off more heat.

The primary object of this invention is to provide a low cost motor arrangement for office machines and the like.

This is accomplished by mounting a fan in the motor housing to draw or blow air over the motor. The housing has a single exhaust outlet that exhausts through the side of the machine housing. By providing suitably located inlets in the walls of the housing, air will be drawn through the housing and the motor before being discharged. With this arrangement a low cost motor and fan assembly can be used in place of the usual high cost motor while improving the machine, in that the temperature inside the housing is actually lower than before.

Other objects and advantages will be pointed out in, or be apparent from, the specification and claims, as will obvious modifications of the single embodiment shown in the drawings, in which:

Figure 1:
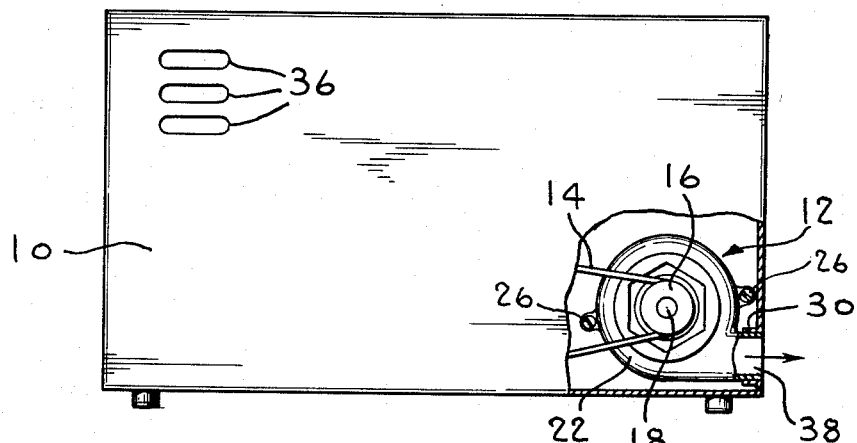
FIG. 1 is a view of an enclosure for the operating mechanism of an electrical appliance partly broken away to show the position of an electric motor therein.
Figure 2:
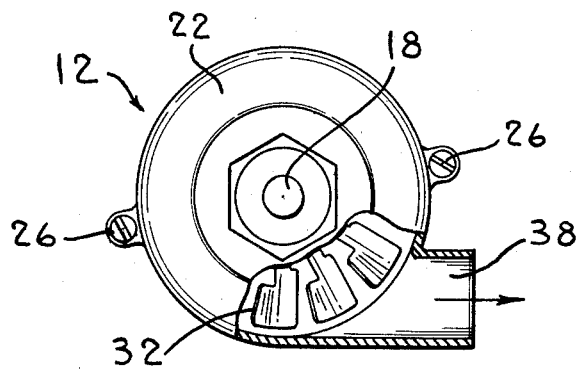
FIG. 2 is a view of the circulating fan for an electric motor.
Figure 3:
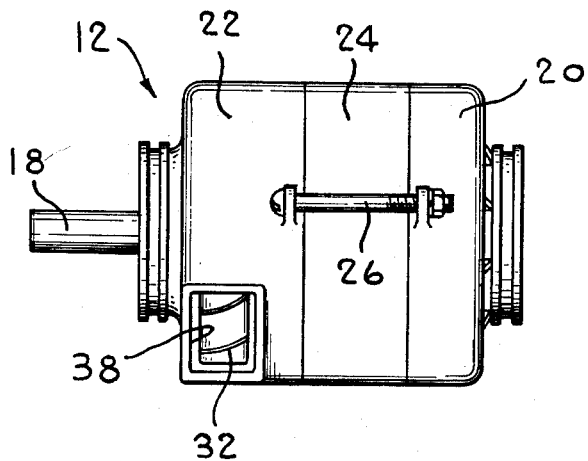
FIG. 3 is a side view of the electric motor.

Referring more particularly to the drawing, a housing 10 is shown which generally represents the enclosure for the operating mechanism of an electric machine such as a tape recorder, electric typewriter and the like. A motor 12 is mounted in the enclosure to drive the operating mechanism of the machine by means of a belt 14 on pulley 16 on the drive shaft 18 of the motor. The motor has an air inlet cap 20 and an air discharge cap 22 bolted to section 24 by means of bolts 26. The air outlet cap has a side discharge port 38 which fits into an aperture 30 in one side of the enclosure. A fan blade 32 is mounted on the drive shaft within the outlet end of the motor to draw air through the motor and discharge it through the outlet port. A number of apertures 36 are provided in the sides of the housing, so that air drawn through the motor will be drawn through the apertures and will circulate through the enclosure before being discharged by the motor through the port 30. It is not necessary to have a large number of openings in the housing since the housings as assembled are not air tight, and sufficient air will be drawn into the housing by the motor to keep the temperature down.

From the above description it can be seen that by a small modification of a low cost motor, it can be substituted for the high cost cool running motor presently being used in these devices. The cost of modification is relatively small in comparison to the cost difference in the two motors. This arrangement has also been found to provide better operating characteristics for the device by the reduction in operating temperature.

Although only a single embodiment of the present invention has been illustrated and described, it will be apparent to those skilled in the art that various changes and modifications may be made therein without departing from the spirit of the invention or from the scope of the appended claims.

I claim:
1. In an electrical device including operating mechanisms and an enclosure for said operating mechanisms, the improvement of motor means within said enclosure for driving operating mechanism therein, a housing for said motor means including relatively spaced air inlet and outlet openings, fan means within said motor housing driven by said motor means and so arranged relative to said air inlet and outlet openings to effect a flow of cooling air through said motor means when in operation, said motor housing outlet opening connected to an outlet in said enclosure opening to the atmosphere ambient said enclosure to exhaust said cooling air passing through said motor means to said ambient atmosphere and said motor housing inlet opening communicating with the interior of said enclosure, and said enclosure including at least one opening to the atmosphere ambient said enclosure whereby when the motor means is in operation said fan draws fresh ambient air into said enclosure interior and circulates said air through said enclosure and through said motor means thereby cooling the operating mechanism within said enclosure and said motor means.

2. In an electrical device including operating mechanisms and an enclosure for said operating mechanisms, the improvement of a motor disposed in said enclosure and having means operative to drive said operating mechanisms, a housing for said motor including relatively spaced air inlet and outlet openings therein, fan means within said motor housing driven by said motor for directing a flow of cooling air through said motor between said inlet and outlet openings in said motor housing, said enclosure including an outlet opening to the atmosphere ambient said enclosure, said motor outlet opening connected to said enclosure outlet opening to exhaust said cooling air from said enclosure to said ambient atmosphere, said motor housing inlet opening communicating with the interior of said enclosure, and said enclosure including at least one inlet opening to the atmosphere ambient said enclosure for admitting ambient air to said enclosure interior under the influence of said fan for circulation about the operating mechanism within said enclosure and for flow through said motor prior to discharge through said outlet opening in said enclosure.

3. The combination of claim 2 wherein said motor inlet and outlet openings are relatively axially spaced in said motor housing.

References Cited by the Examiner
UNITED STATES PATENTS

| | | | |
|---|---|---|---|
| 579,051 | 3/97 | Fiske | 310—52 |
| 1,243,422 | 10/17 | Kettering et al. | 290—26 |
| 2,218,212 | 10/40 | Nassos. | |
| 2,247,817 | 7/41 | McMahan | 230—117 |
| 2,284,656 | 6/42 | Heter | 310—62 |
| 2,394,060 | 2/46 | Holmes | 317—100 X |
| 2,516,184 | 7/50 | Christie | 317—100 |

FOREIGN PATENTS

| | | |
|---|---|---|
| 41,182 | 11/29 | Denmark. |
| 674,587 | 10/29 | France. |
| 1,089,404 | 9/54 | France. |

MILTON O. HIRSHFIELD, *Primary Examiner.*
DAVID X. SLINEY, *Examiner.*